United States Patent [19]

Carlson et al.

[11] Patent Number: 4,509,589
[45] Date of Patent: Apr. 9, 1985

[54] CIRCULATING BED HEAT EXCHANGER FOR COOLING SHALE ASH

[75] Inventors: Franklin B. Carlson, Broomfield; Robert N. Hall, Boulder, both of Colo.

[73] Assignee: Tosco Corporation, Santa Monica, Calif.

[21] Appl. No.: 405,529

[22] Filed: Aug. 5, 1982

[51] Int. Cl.³ .............................................. F28G 13/00
[52] U.S. Cl. .................................... 165/95; 165/111; 165/DIG. 27
[58] Field of Search ................ 165/95, 104.15, 104.16, 165/DIG. 27, 104.18, 111

[56] References Cited

U.S. PATENT DOCUMENTS

| | | | |
|---|---|---|---|
| 4,296,800 | 10/1981 | Johnson | 165/95 |
| 4,356,151 | 10/1982 | Woebecke et al. | 165/104.18 X |
| 4,370,309 | 1/1983 | Cheng | 165/95 X |
| 4,404,178 | 9/1983 | Johnson et al. | 165/95 X |

FOREIGN PATENT DOCUMENTS 2087534 5/1982 United Kingdom ................ 165/95

*Primary Examiner*—Sheldon J. Richter
*Attorney, Agent, or Firm*—David J. Oldenkamp; Eric Schwartz

[57] ABSTRACT

A process and system for simultaneously cooling shale ash fines and flue gas produced during the combustion of spent shale. The flue gas and fine solids are introduced into a heat exchange zone for contact with conventional heat exchange tubes. Heat transfer particles are introduced into the heat exchange zone for mixing with the flue gas to provide increased heat transfer rates between the flue gas and heat exchange equipment. The heat transfer solids are also of a sufficient size to provide continual scrubbing of the heat exchanger surfaces to prevent the build up of an insulating layer of fine dust particles. A staged cooling system and process is also disclosed.

15 Claims, 4 Drawing Figures

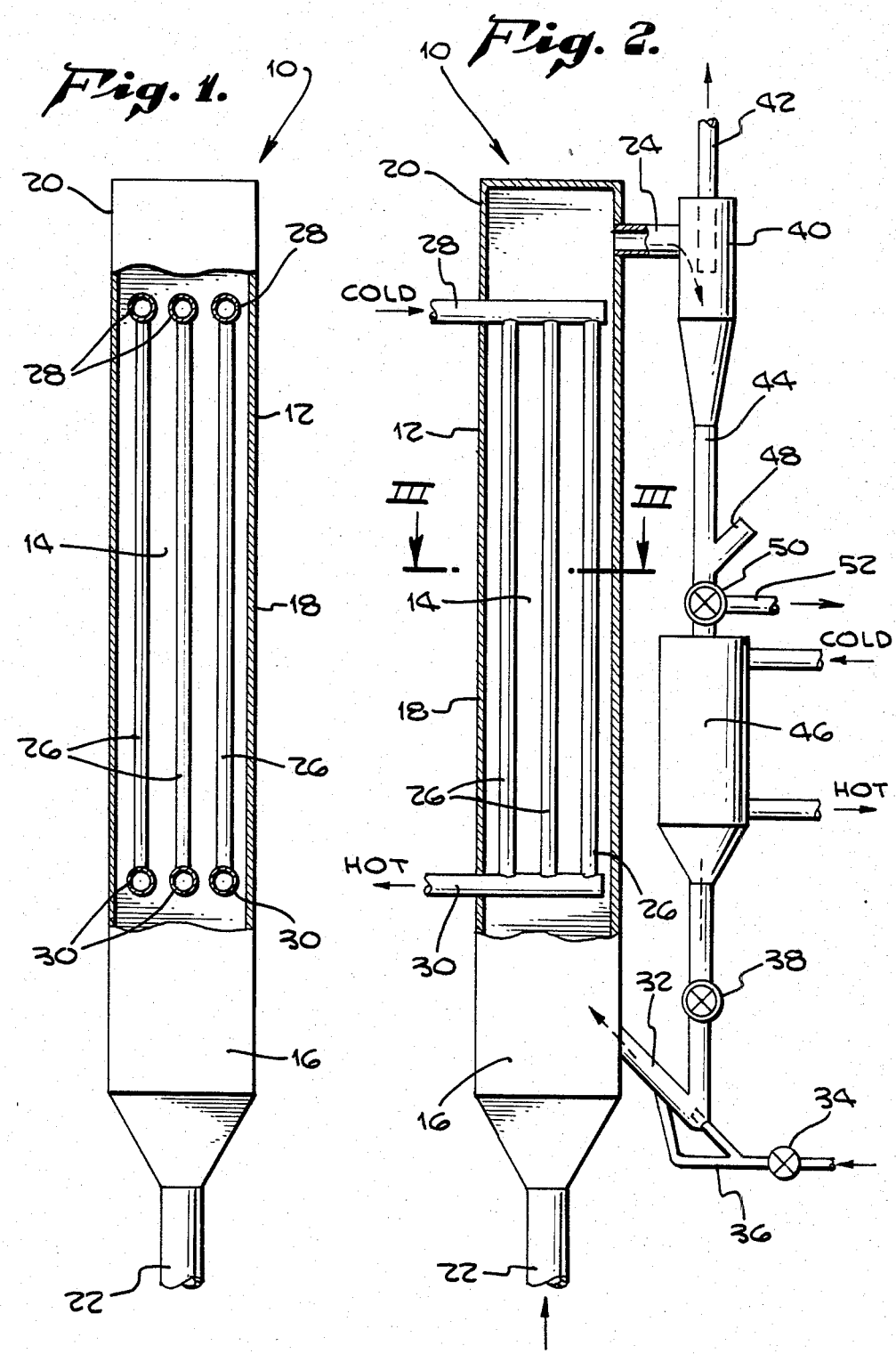

CIRCULATING BED HEAT EXCHANGER FOR COOLING SHALE ASH

BACKGROUND OF THE INVENTION

The present invention relates generally to the recovery of heat from hot gas streams containing entrained hot fine particles. More particularly, the present invention relates to a circulating bed heat exchanger for recovering heat from the hot flue gas produced during dense phase fluidized bed combustion of spent shale.

Oil shale is a marlstone-type mineral having varying amounts of an organic complex known as kerogen dispersed therein. Vast reserves of oil shale are known to be present in major portions of Utah, Wyoming and Colorado. The extent of these reserves has been estimated at between three and seven trillion barrels of shale oil. The presence of these vast reserves of oil shale has sparked intense interest in developing processes for recovering useful oil and gas from this inorganic mineral-organic complex mixture.

As is well known, in order to convert the organic polymer kerogen into a commercially useful form, the kerogen must be decomposed and separated from the inorganic components of oil shale. The majority of present processes which appear commercially feasible involve heating the oil shale in a reducing atmosphere to pyrolyze the kerogen to form volatile oils and gaseous hydrocarbon products.

Typically, the raw oil shale is dried and preheated, if desired, to temperatures between 200° F. and 600° F. The preheated oil shale is then passed to a retort where it is heated to temperatures in the range of 800° F. to 1100° F. At these temperatures, the kerogen thermally decomposes to form volatile hydrocarbon products. These volatile products are separated from the remaining inorganic oil shale residue and recovered in suitable condensors. The residue remaining after pyrolysis is commonly referred to as spent shale and typically includes up to about 5 percent to 10 percent by weight combustible carbonaceous residue and may contain even higher amounts depending upon the particular oil shale feed and retorting conditions.

An important aspect of any pyrolysis process is the means by which the raw oil shale is heated to pyrolysis temperatures. Numerous different heating systems have been devised including indirect heating, direct heating with hot fluid gases and direct heating by mixture with hot heat-carrying bodies. The use of heat-carrying bodies for direct heat transfer to the oil shale has been found to be an especially effective way to heat the oil shale solids. The types of heat carriers developed for use in pyrolysis systems range widely in composition, size and structure. Heat carriers ranging in size from relatively large spherical ceramic balls down to relatively small particles of sand, minute alumina beads, attrition-resistant shale ash and other particulate solids are among the materials which have been found suitable for use as heat carriers.

As is apparent, after heat transfer and the resultant partial cooling in the retort, the heat carrier must be reheated prior to recycling. Numerous different heat carrier circuits have been developed for providing heating, separation and classification of the heat carrier particles. One especially convenient source of heat for reheating the heat carrier solids is provided by combusting the carbonaceous residue present in spent shale. Combustion is generally carried out at temperatures in the range of 1100° F. to 1700° F. and produces hot shale ash particles which contain little if any combustible carbon residue.

During spent shale combustion, the spent shale and shale ash particles undergo attrition to varying degrees depending upon combustion conditions and the attrition resistance of the shale. Attrition resistance of various spent shales and shale ashes depends, to a large extent, upon the kerogen content of the initial oil shale feed. Rich oil shales tend to produce pulverulent spent shale and shale ash which break down readily to produce fine particles. When the spent shale residue from retorting rich shales, such as those from the Green River formation are combusted in a fluidized bed combustion unit, essentially all of the ash from the combustor is entrained in the combustor flue gas. On the other hand, kerogen-lean shales produce a relatively attrition resistant spent shale and shale ash which does not readily decrepitate. Even for the very lean oil shales, however, a certain amount of attrition will occur during retorting and combustion to produce fine particles of shale ash which are entrained in the spent shale combustor flue gas.

The fine particles of shale ash at the elevated temperatures of spent shale combustion are considered a waste product and are typically discarded from the oil shale pryolysis system. In order to insure maximum energy efficiency for the process, it is important that the heat content of the shale ash fines and combustor flue gas be recovered prior to disposal by cooling the flue gas and ash fines.

A common way to obtain this cooling is to separate the ash fines from the flue gas and to cool each stream separately. The flue gas is usually cooled in a tubular exchanger while the ash is cooled in a rotary tube cooler, fluid bed or other solids cooler.

The problem with this type of two stream cooling process is that the ash particle size range is very broad and much of the ash is fine (less than 150 mesh). Due to this small size, it is difficult to remove all ash from the flue gas. Cooling the separated ash is also a problem due to the ease with which the ash can become airborne, the high potential for the fine ash to foul heat transfer surfaces and the low heat transfer coefficients which usually result from such fouling. Also, the separated ash is difficult to fluidize and is difficult to convey.

It has been found that the problems associated with the handling and cooling of spent shale combustor flue gas are reduced if the ash and flue gas are cooled simultaneously. This simultaneous flue gas and entrained ash cooling may be conducted in tubular heat exchangers of the type used for cooling the flue gases from steam boilers in utility plants. Although simultaneous cooling of ash and flue gas is desirable, it has been found that the heat transfer coefficient during simultaneous flue gas and ash cooling is much less than that achievable during separate cooling of the separated ash. For example, the heat transfer coefficient from a dense phase fluidized bed of shale ash to a steel tube immersed in the bed is usually on the order of 30 to 50 Btu/ft$^2$ °F. per hour. The heat transfer coefficient for the same tube, temperature and gas flow, but with the reduced level of solids typically present in combustor flue gas, is greatly reduced. In addition, the fine shale ash particles tend to coat the heat exchanger walls to form an insulating layer of ash which further reduced heat transfer and cooler efficiency.

It would therefore be desirable to provide a simultaneous flue gas and entrained ash cooling system and process in which the heat transfer coefficient from the flue gas and entrained fine solids is maximized. It would also be desirable to provide such a process in which the formation of an insulating coating of shale ash fines on the heat exchanger surfaces is reduced.

SUMMARY OF THE INVENTION

In accordance with the present invention, a process and system are provided for removing heat from a hot flue gas containing hot entrained fine particles simultaneously and at high heat transfer rates. Further, the system and process provides for continual scrubbing of heat exchanger surfaces to prevent the build-up of fine dust insulating coatings which undesirably reduce heat transfer and recovery.

The present invention is based upon a system and process in which a hot gas stream containing entrained hot fine particles is introduced upwardly into a gas/solids cooling vessel defining a heat exchange zone. The entrained hot fine particles range in size from relatively large fine particles to relatively small fine dust particles. As a particular feature of the present invention, means are provided for introducing heat transfer solids into the heat exchange zone. These heat transfer solids are larger than the relatively fine dust particles, but sufficiently small so that their terminal settling velocities are below the velocity of the upflowing gas stream.

The heat transfer solids are entrained in the upflowing gas stream and turbulently contacted with the hot fine particles. The introduction of the heat transfer solids effectively increases the available surface area of solids in the gas stream to increase heat transfer rates to the heat exchange systems associated with the gas/solids cooling vessel. After cooling of the flue gas and entrained solids blend of heat transfer solids and fine particles, the cooled flue gas and entrained solids blend is removed from the gas/solids cooling vessel.

As an additional feature of the present invention, the cooled flue gas is separated into a flue gas stream containing entrained fine dust particles and a recycle stream containing the cooled relatively large fine particles and heat transfer solids. The recycle stream is recirculated or recycled back to the gas/solids cooling vessel for use as the heat transfer solids. In addition to providing increased heat transfer rates for hot flue gases, the introduction of heat transfer solids into the flue gas provides a scrubbing action against the cooling vessel walls which prevents the formation of an insulating layer of fine dust particles on the cooling vessel walls.

The present invention provides the convenience and simplicity of simultaneous flue gas and fine solid particle cooling while also providing increased heat transfer rates and self-cleaning actions not available in prior art coolers.

The above discussed and many other features and attendant advantages of the present invention will become apparent as the invention becomes better understood by reference to the following detailed description when considered in conjunction with the accompanying drawings.

BRIEF DESCRIPTION OF THE DRAWINGS

FIG. 1 is a partial cut-away back view of a preferred heat exchanger in accordance with the present invention.

FIG. 2 is a partial cut-away side view of the heat exchanger shown in FIG. 1.

DETAILED DESCRIPTION OF THE INVENTION

Figure 4:
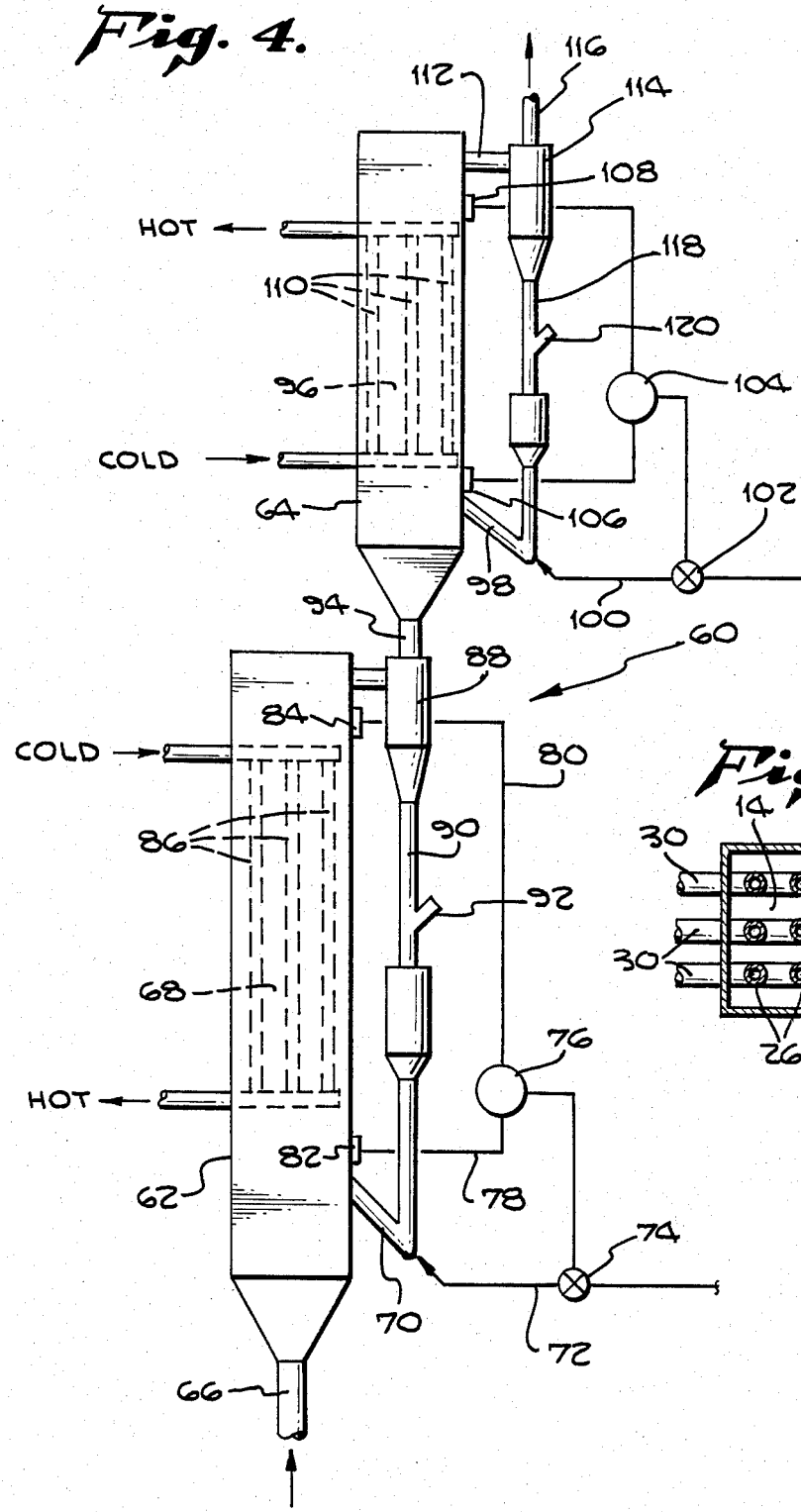
FIG. 4 is a partially schematic view of an additional preferred embodiment of the circulating bed heat exchanger in accordance with the present invention.
Figure 3:
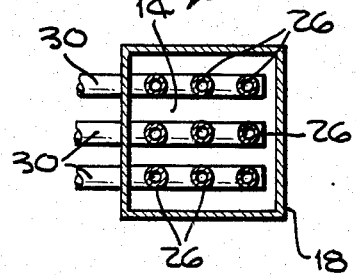
FIG. 3 is sectional view of FIG. 2 taken in the III—III plane.

The present invention has wide application to the cooling of hot gas streams which contain entrained fine solid particles. Gas streams which may be cooled utilizing the system and process of the present invention include combustion gases from cracking catalyst regeneration, phosphate rock calcination, ore roaster flue gas and any process wherein substantial amounts of solids are entrained in the hot flue gases. The present invention has been found especially useful for cooling the hot flue gas produced during the dense phase fluidized bed combustion of spent shale. The following description of the invention will be limited to an exemplary discussion of the use of the circulating bed heat exchanger system and process for cooling spent shale combustor flue gas containing entrained shale ash fines.

A preferred exemplary circulating bed heat exchanger in accordance with the present invention is shown generally at 10 in FIGS. 1 and 2. As best shown in FIG. 2, the circulating bed heat exchanger 10 includes a gas/solids cooling vessel 12 defining a heat exchange zone 14. The cooling vessel 12 includes a bottom portion 16, middle portion 18 and top portion 20. An inlet 22 is provided at the vessel bottom 16 into which the hot gas stream containing entrained hot fine particles is introduced. An outlet 24 is provided at the vessel top portion 20 through which the cooled gas stream and entrained solids are removed from the heat exchange zone 14.

As previously mentioned, the preferred hot gas stream for cooling is the flue gas produced during dense phase fluidized bed combustion of spent shale. The particular characteristics of the spent shale combustor flue gas will vary depending upon the type of spent shale being combusted and combustor operating conditions. The temperature of the flue gas will preferably be between 1100° F. and 1700° F. The temperature of the flue gas is not critical. The particle sizes entrained in the flue gas will generally be below 30 mesh. For the purposes of this description, mesh sizes will be given as U.S. Standard Screen size. More preferably, the entrained fine solids will have particle sizes below 40 mesh. The particles will range in size from relatively large fine particles having particle sizes between 40 mesh and 150 mesh down to relatively small fine dust particles below 150 mesh and ranging down to sizes of a few microns.

The amount of fine particles entrained in the combustor flue gas and the relative size distribution of particles will vary depending upon the type of spent shale being processed. For decrepitating spent shale, the amount of entrained fine solids below 150 mesh will be larger than the amount present during combustion of an attrition resistant spent shale. The relative size distribution for an attrition resistant lean shale and for a decrepitating rich shale are shown in Table 1.

TABLE 1
PARTICLE SIZE DISTRIBUTION OF ASH

| | Lean Shale (30 GPT) | Rich Shale (37 + GPT) |
|---|---|---|
| 20 × 40 Mesh | 0.1 wt. % | — wt. % |
| 40 × 60 | 0.9 | — |
| 60–80 | 4.8 | — |
| −180 + 125 Micron | 1.0 | 1.1 |
| −125 + 88 | 5.4 | 3.5 |
| −88 + 62 | 3.4 | 4.1 |
| −62 + 44 | 1.9 | 4.8 |
| −44 + 31 | 2.9 | 6.4 |
| −31 + 22 | 5.6 | 6.9 |
| −22 + 16 | 5.4 | 9.1 |
| −16 + 11 | 8.0 | 10.3 |
| −11 + 7.8 | 10.9 | 11.1 |
| −7.8 + 5.5 | 12.0 | 11.7 |
| −5.5 + 3.9 | 13.3 | 11.7 |
| −3.9 + 2.8 | 10.9 | 9.0 |
| −2.8 | 13.3 | 10.4 |

As shown in Table 1, the fina ash from the lean shale is just as fine or finer than the rich oil shale. The relative amount of fines (i.e. −40 mesh) present in the flue gas does vary depending upon the type of spent shale being combusted and combustor fluidization velocities and particle sizes.

The hot flue gas as described above is introduced through inlet 22 into the heat exchange zone 14. The velocity of the flue gas through heat exchange zone 14 is maintained at a sufficient level to entrain the fine particles as a dilute phase. The gas velocity should however be low enough to provide adequate residence time of the flue gas within the heat exchange zone 14 to provide desired levels of the heat exchange. Preferred gas stream velocities in heat exchange zone 14 are from between about 6 feet per second up to 15 feet per second. The terminal settling velocity for the relatively large shale ash particles (i.e. 40×150 mesh) is between about 3 and 6 feet per second.

Heat exchange means such as cooling tubes 26 are provided for removing heat from the flue gas and entrained fine particles. Any type of conventional heat exchange or cooling apparatus may be utilized to remove heat from the heat exchange zone 14, so long as the flow of the flue gas is not unduly obstructed. The cooling tubes 26 are connected to an inlet manifold 28 through which a heat exchange medium, such as water or other suitable liquid or gas, is passed into the cooling tubes 26. Outlet manifold 30 is provided for removing the heat exchange media from cooling tubes 26.

In accordance with the present invention, heat transfer solids are introduced into the heat exchange zone 14 for mixing with the hot fine particles to increase the solids surface area available for contact with cooling tubes 26 to thereby increase heat transfer between the flue gas and cooling tubes 26. Means for introducing the heat transfer solids such as heat transfer solids inlet 32 is provided at the vessel bottom 16. Air or other suitable gas is provided by way of valve 34 and line 36 for turbulently injecting the heat transfer solids into the flue gas in heat exchange zone 14. The flow of heat transfer solids to inlet 32 is controlled by valve 38.

The heat transfer solids may be any suitable fine particulate solids having a particle size which is sufficiently small to be entrained in the gas stream flowing through heat exchange zone 14, while being larger than the relatively fine dust particles (i.e. less than 325 mesh) which adhere to the vessel wall and cooling tubes 26. Although many different fine solids such as sand, alumina and powdered metals may be utilized, it is preferred that the relatively large fine shale ash particles present in the combustor flue gas be used as the heat transfer solids. The temperature of the heat transfer solids is not particularly important so long as it is at or below the temperature of the flue gas. Preferably, the heat transfer solids will be at a temperature of 300° F. to about 700° F. below the temperature of the flue gas and entrained fine particles.

The rate of introduction of heat transfer solids through line 32 into heat exchange zone 14 may be varied depending upon initial ash levels in the combustor flue gas, heat transfer solids temperature, gas stream velocity and desired levels of heat exchange. Preferably, heat transfer solids will be added to provide heat transfer solids levels in the combustor flue gas of between about 10 pounds of heat transfer solids per pound of air and about 60 pounds of heat transfer solids per pound of air. For flue gases containing relatively high amounts of fine dust particles, higher amounts of heat transfer solids are preferred to insure adequate scrubbing of the vessel walls and cooling tubes 26 to prevent fine dust build-ups. The preferred density of heat transfer solids within the heat exchanger is between 1 lb/ft$^3$ to 10 lb/ft$^3$.

The cooled flue gas and entrained solids blend of fine solids and heat transfer solids is removed through outlet 24 and passed to cyclone 40. The temperature of the flue gas and entrained solids blend will vary depending upon a number of variables including vessel design and capacity, the configuration of heat exchanger 12 and various process parameters. Preferably, the exit gas stream will be at a temperature below about 800° F.

The cyclone 40 provides separation means for separating the cooled gas stream and solids blend into an output or flue gas stream containing the cooled gas and cooled fine dust particles and a recycle stream containing cooled heat transfer solids and the relatively large fine particles. The cyclone 40 may be any type of cyclone or other conventional gas/solid separation equipment which provides the desired separation of large fine particles from the flue gas and small fine particles. The flue gas containing the relatively small dust particles (minus 150 mesh) is exhausted through line 42 for transfer to a bag house or other conventional filtering equipment for fine dust removal.

The relatively large shale ash particles or recycled stream are passed through line 44 by way of valve 38 back to the cooling vessel 12 for re-introduction to the heat exchange zone 14. Auxiliary heat exchanger 46 is provided for removing additional heat from the recycled stream if desired. Supplemental heat transfer solids inlet 48 is provided for introducing supplemental heat transfer solids to recycle line 44 during start up operations and during the cooling of flue gases containing large relative amounts of fine dust particles where there may be an insufficient amount of relatively large fine particles in the flue gas to provide an adequate supply of heat transfer solids.

During initial start up of the circulating bed heat exchanger 10, it will be necessary to provide supplemental heat transfer solids through inlet 48 until sufficient relatively large fine particles have been separated in cyclone 40 to provide an adequate heat transfer solids recycle stream. During continued operation, excessive relatively lage fine shale ash particles may build up in the recycle stream passing through the recycle line 44. Valve 50 and outlet line 52 are provided for removing surplus solids from the recycle stream when and if necessary.

Referring now to FIG. 4, a staged cooling system in accordance with the present invention is shown generally at 60. The staged system 60 includes a first circulating bed heat exchanger 62 and a second circulating bed heat exchanger 64. Both of the circulating bed heat exchangers 62 and 64 operate similarly to the heat exchanger previously described. The hot flue gas is introduced through inlet 66 into the heat exchange zone 68 defined by the first heat exchanger 62.

The heat transfer solids are injected into the heating zone 68 through inlet 70. The rate of heat transfer solids injection into the heat transfer zone through inlet 70 is controlled by the amount of gas being introduced into inlet 70 through line 72. The injection gas in line 72 is in turn controlled by valve 74 which is operated by temperature controller 76. Temperature controller 76 is connected by way of lines 78 and 80 to thermal detectors 82 and 84 respectively. The temperature controller 76 is designed to operate valve 74 to inject sufficient heat transfer solids into the heat exchange zone 68 to maintain a desired temperature difference between detectors 82 and 84. As will be realized, by varying the rate of gas injected through line 72 into inlet 70, the rate of heat transfer solids injected into the heat exchange zone 68 is accordingly varied.

The flue gas, entrained fine particles and heat exchange solids are contacted in heat exchange zone 68 with heat exchanger 86. After cooling, the flue gas and entrained solids blend are passed to cyclone 88 for separation. The cyclone 88 is designed to provide less than complete separation of the relatively large fine particles from the flue gas and small dust particles. Alternatively, the cyclone may be designed to provide separation from the flue gas and solids blend of only the largest of the fine particle solids. The separated-out larger ash particles are passed from cyclone 88 through line 90 to inlet 70 for recycling to the heat exchange zone as heat transfer solids.

During start up of the first circulating bed heat exchanger 62, it is necessary to fill line 90 with supplemental heat transfer solids through inlet 92. Since a valve, such as valve 38 in FIG. 2 is not provided in line 90, start up of the system in FIG. 4 without line 90 being full of solids would result in reverse flow of the flue gas through inlet 70 and line 90.

The partially cooled flue gas and remaining entrained solid particles are removed from cyclone 88 through line 94 for introduction into the heat exchange zone 96 defined by the second circulating bed heat exchanger 64. The second heat exchanger 64 will preferably have a smaller cross-sectional area than the first heat exchanger 62 since the volume of the gas stream will be decreased due to partial cooling in the first heat exchanger 62. In this way, the velocity of the gas streams moving through both coolers can be maintained at approximately the same level.

Heat transfer solids are introduced through inlet 98 into the heat transfer zone 96. As with the first heat exchanger, the rate of heat transfer solids introduction is regulated by the flow of injecting or entraining gas introduced through line 100. Valve 102 is provided for regulating gas flow through line 100. Valve 102 may be controlled by a thermal control system such as that described for the first heat exchanger 62. Alternatively, valve 102 may be controlled by a differential pressure controller 104 which maintains a constant pressure drop between the heat exchanger inlet and outlet. The differential pressure controller 104 receives pressure information from pressure taps 106 and 108. The pressure controller 104 is designed to provide operation of valve 102 to maintain heat transfer solids injection levels at those necessary to maintain a predetermined pressure drop or difference between pressure sensors 106 and 108.

Although the use of air to inject and entrain the heat transfer solids through their respective inlets is not absolutely necessary, it is preferred since it provides an added degree of turbulent mixing between the heat transfer solids and entrained fine particles to increase heat transfer and thermal efficiency of the cooler. Further, the scrubbing action provided by the heat transfer solids is also enhanced due to the increased turbulence.

The flue gas and entrained solids blend of fine particles and heat transfer solids turbulently contact heat exchanger 110. After heat transfer to heat exchanger 110, the flue gas and entrained solids blend is removed from the recirculating bed cooling vessel 64 through outlet 112. The flue gas and entrained solids blend are then passed to cyclone 114 where separation into a recycle stream and flue gas containing only fine dust particles is provided. The flue gas and fine dust particles are removed through cyclone outlet 116 for transfer to further conventional processing in a bag house or the like. The recycled stream is passed through line 118 to inlet 98 for recycle to the heat exchange zone 96 as the heat transfer solids.

Supplemental heat transfer solids are added through inlet 120 to fill line 118 during start up, as discussed above for the first circulating bed heat exchanger 62. Supplemental solids may also be added to line 118 through inlet 120 as needed during operation of the system.

The use of staged circulating bed heat exchangers is desirable when the heat from the hot flue gas is to be used for a number of purposes. For example, the lower or first heat exchanger 62 may be used to pre-heat air while the upper or second heat exchanger 64 may be used to produce steam. Further, the staged system may be utilized to provide complete cooling of relatively hot flue gas streams where a single cooler would not be sufficient to lower the gas stream temperature to desired levels.

In addition to being able to cool the flue gas and ash to selected temperatures, the staged cooling system allows the heat flux from the flue gas and ash to the cooling tubes to be maximized. Heat flux (Q) for a given set of cooling tubes may be calculated by the following equation: $Q = U_o \Delta T A$. $U_o$ is the heat transfer coefficient for the particular cooling tubes at given inlet flue gas temperatures and ash flow rates. $\Delta T$ is the temperature difference between the cooled flue gas and the temperature of the steam or other heat exchanger fluid generated from the heat exchanger. (A) equals the surface area of the cooling tubes.

In an exemplary process, the inlet flue gas and ash flow rates and temperatures are constant. In this example, the flue gas and ash are cooled to a temperature of 800° F. The saturated steam heat exchange liquid is heated to a temperature of 500° F. The $\Delta T$ for this example is therefore 300° F. If the heat transfer coefficient ($U_o$) remains constant, then the heat flux depends only upon the cooling tube surface area (A). If particle recycling in accordance with the present invention is not utilized, the heat transfer coefficient decreases with time as the cooling tubes begin to foul or otherwise become coated with ash. When circulation of heat transfer solids is begun, decreases in the heat transfer coefficient due to shale ash coating is eliminated and additionally the heat transfer coefficient is increased due to the increased solids flow rate into the heat exchange zone. However, the increased flow rate of cooler heat transfer solids into the heat exchange zone decreases the ΔT value. At some point, the increase in heat transfer coefficient provided by circulation of heat transfer solids to the heat exchange zone is outweighed by the decreases in ΔT resulting in net decreases in overall heat transfer flux (Q). It is advantageous to use multiple stages of cooling to maintain ΔT values at levels necessary to insure that heat flux (Q) is optimized.

The circulating solids heat exchanger system and process in accordance with the present invention provides the advantages of high heat transfer rates ranging up to 25 Btu/ft$^2$°F. per hour, low pressure drop between the cooler inlet and outlet, simple construction and minimal ash fouling. Further, the cooler is amenable to large scale operation.

Having thus described the present invention, it will be understood by those skilled in the art that the present invention is not limited to the specific embodiments as illustrated herein. For example, with large size commercial scale heat exchangers it may be desirable to use multiple cyclones which provide multiple recycle injection points to facilitate mixing of the heat transfer solids and gas streams at the bottom of the heat exchanger. Further, the number of stages can be increased to more than two if necessary to provide desired levels of cooling. Accordingly, the present invention is limited only by the following claims.

What is claimed is:

1. In a process for removing heat from a hot gas stream containing entrained hot fine particles by passing said gas stream into contact with a heat exchange surface defining a heat exchange zone, wherein the improvement comprises increasing the rate of heat transfer between said gas stream and said heat exchange surface by introducing sufficient gas stream entrainable heat transfer solids into said gas stream to cause the density of solids in said heat exchange zone to be between 1 lb/ft$^3$ and 10 lb/ft$^3$.

2. An improved process according to claim 1 wherein said fine particles are smaller than 40 mesh.

3. An improved process according to claim 1 wherein said fine particles are shale ash entrained in the flue gas from a dense phase fluidized bed spent shale combustor.

4. A process for removing heat from a hot gas stream containing entrained hot fine particles ranging in size from relatively large fine particles to relatively small fine dust particles, said process comprising the steps of:
    flowing said gas stream upwardly through a heat exchange zone at a velocity above the terminal settling velocity of said relatively large fine particles;
    adding sufficient heat transfer solids to said flowing gas stream to cause the density of solids in said heat exchange zone to be between 1 lb/ft$^3$ and 10 lb/ft$^3$, said heat transfer solids being at a temperature below the temperature of said fine particles and having terminal settling velocities below the velocity of said gas stream, said heat transfer solids being mixed with said hot fine particles to form a solids blend of heat transfer solids and partially cooled fine particles, said solids blend being entrained in said upflowing gas stream;
    removing heat from said solids blend by contacting said gas stream and entrained solids blend with a heat exchanger to form a cooled gas stream containing an entrained cooled solids blend; and
    removing said cooled solids blend entrained in said cooled gas stream from said heat exchange zone.

5. A process according to claim 4 including the additional steps of:
    separating said cooled gas stream into an output stream containing cooled gas and cooled fine dust particles and a recycle stream containing cooled heat transfer solids and relatively large fine particles; and
    recycling said recycle stream to said heat exchange zone as said heat transfer solids.

6. A process according to claim 4 including the additional steps of:
    separating said cooled gas stream into an output stream containing cooled gas and cooled fine dust particles and a stream containing cooled heat transfer solids and relatively large fine particles; and
    passing said cooled gas and fine dust particles to one or more additional heat exchange zones for additional removal of heat therefrom.

7. A process according to claim 4 wherein the heat transfer solids are between 300° F. and 700° F. cooler than said hot fine solid particles.

8. A process according to claim 4 wherein said relatively large fine particles have particle sizes larger than 150 mesh and said small fine dust particles have particle sizes smaller than 150 mesh.

9. A process according to claim 8 wherein the temperature of said hot gas stream and hot entrained fine particles is between 1000° F. and 1700° F.

10. A process according to claim 8 wherein said entrained fine particles are shale ash.

11. A process according to claim 10 wherein the velocity of said gas stream is about 6 feet per second.

12. A process for removing heat from a hot gas stream containing entrained hot fine particles ranging in size from relatively large fine particles to relatively small fine dust particles, said process comprising the steps of:
    flowing said gas stream upwardly through a heat exchange zone at a velocity above the terminal settling velocity of said relatively large fine particles;
    adding sufficient heat transfer solids to said upwardly flowing gas stream to cause the density of solids in said heat exchange zone to be between 1 lb/ft$^3$ and 10 lb/ft$^3$, said heat transfer solids being at a temperature below the temperature of said fine particles and having terminal settling velocities below the velocity of said gas stream, said heat transfer solids being mixed with said hot fine particles to form a solids blend of heat transfer solids and partially cooled fine particles, said solids blend being entrained in said upflowing gas stream;
    separating said gas stream and entrained solids blend into a first stream containing said gas stream and relatively small fine dust particles and a second stream containing said heat transfer solids and partially cooled relatively large fine particles; and
    removing heat from said second stream by contact with a heat exchanger to form a cooled second stream.

13. A process according to claim 12 wherein said cooled second stream is recycled to said heat exchange zone as said heat transfer solids.

14. A staged process for removing heat from a hot gas stream containing entrained hot fine particles ranging in size from relatively large fine particles to relatively small fine dust particles, said staged process comprising the steps of:

flowing said gas stream through a first heat exchange zone at a velocity above the terminal settling velocity of said fine solid particles;

adding sufficient heat transfer solids to said gas stream to produce a first solids blend entrained in said gas stream and a solids density in said first heat exchange zone of between 1 lb/ft$^3$ to 10 lb/ft$^3$;

removing heat from said first solids blend by contacting said gas stream with a heat exchanger in said first heat exchange zone to form a first cooled gas stream;

removing said first cooled gas stream from said first heat exchange zone;

separating at least a portion of the larger fine particles from said first cooled gas stream to form a first recycle stream;

recycling said first recycle stream back to said first heat exchange zone as said heat transfer solids;

flowing said first cooled gas stream through a second heat exchange zone at a velocity above the terminal settling velocity of said fine particles;

adding sufficient heat transfer solids to said first cooled gas stream to produce a second solids blend entrained in said first cooled gas stream and a solids density in said second heat exchange zone of between 1 lb/ft$^3$ to 10 lb/ft$^3$;

removing heat from said second solids blend by contacting said second solids blend with a heat exchanger in said second heat exchange zone to form a second cooled gas stream; and removing said second cooled gas stream from said second heat exchange zone.

15. A staged process according to claim 14 including the additional steps of:

separating at least a portion of the larger fine particles from said second cooled gas stream to form a second recycle stream; and recycling said second recycle stream back to said second heat exchange zone as said heat transfer solids.

* * * * *